United States Patent [19]

Moore

[11] Patent Number: 5,021,077

[45] Date of Patent: Jun. 4, 1991

[54] HIGH INTEGRITY NATURAL NITROGENOUS GRANULES FOR AGRICULTURE

[75] Inventor: William P. Moore, Hopewell, Va.

[73] Assignee: Harmony Products, Inc., Chesapeake, Va.

[21] Appl. No.: 463,254

[22] Filed: Jan. 10, 1990

[51] Int. Cl.$^5$ ............... C05F 1/00; C05C 9/00; C05G 1/00; C05G 5/00

[52] U.S. Cl. ............... 71/17; 71/18; 71/19; 71/20; 71/28; 71/63; 71/64.05; 426/285; 426/453; 426/644; 426/647; 426/807

[58] Field of Search ............ 71/1, 11, 12, 15, 17, 71/18, 19, 20, 21, 22, 64.05, 64.13, 28–30, 63; 426/285, 453, 629, 630, 641, 647, 656, 657, 807

[56] References Cited

U.S. PATENT DOCUMENTS

| | | | |
|---|---|---|---|
| 2,977,214 | 3/1971 | McLellan | 71/64.04 |
| 3,655,395 | 4/1972 | Karnemaat | 426/531 |
| 3,939,280 | 2/1976 | Karnemaat | 426/531 |
| 3,942,970 | 3/1976 | O'Donnell | 210/770 X |
| 4,081,366 | 3/1978 | O'Donnell | 210/725 |
| 4,185,680 | 1/1980 | Lawson | 71/12 X |
| 4,226,712 | 10/1980 | Kamei | 71/12 X |
| 4,743,287 | 5/1988 | Robinson | 71/12 |

Primary Examiner—Ferris H. Lander

[57] ABSTRACT

A method of preparing high integrity natural nitrogenous granules for agriculture by heating natural nitrogenous materials under alkaline conditions until the materials develop adhesive properties, forming the materials into granules by mechanical means, and heating the natural nitrogenous granules until they harden; and the compositions formed by this method. The granules for agriculture include natural fertilizers, secondary nutrients, micronutrients, and natural animal feed protein supplements. The method also provides natural based plant food and animal feed supplement granules containing natural or synthetic additive substances which are useful in agriculture. The natural materials used in the method include poultry waste, poultry feather meal, hair meal, seafood meal, blood meal, bone meal, soybean meal, food waste, and grain by-products. The method provides natural nitrogenous granules which are free of disagreeable odor by admixing reactive aldehyde compounds with the natural nitrogenous materials prior to granule formation.

15 Claims, No Drawings

HIGH INTEGRITY NATURAL NITROGENOUS GRANULES FOR AGRICULTURE

FIELD OF THE INVENTION

This invention is directed to the use of natural materials as plant foods and animal feed supplements and more particularly to the conversion of low value, or worthless, natural by-products and wastes to valuable granules which have high physical integrities and are valuable products for use in the field of agriculture.

BACKGROUND OF THE INVENTION

During the recorded history of man, nitrogenous natural materials have been used as plant foods and animal feeds. The nitrogen in natural materials is usually present as one or more of a wide variety of proteins. These proteinaceous materials, when used as plant foods or animal feeds, decompose slowly into mineral nitrogen compounds which can be readily utilized by growing plants without damage to the environment in which they are used. They can also be effectively digested and utilized by animals consuming them.

As world population density has increased several important changes have occurred in the availability and use of the proteinaceous materials. Virgin nitrogenous natural materials are now usually too valuable for use as plant foods or animal feed supplements. Huge amounts of natural by-products and natural wastes are produced after the primary, and perhaps secondary, usages of the nitrogenous natural materials and present a large disposal problem. Most of this natural material is available in dilute, low bulk density, amorphous, mixed forms and are generally commercially unusable in agriculture. Some of these natural materials commonly available in excess are by-products and wastes from processing grains such as soybeans; and by-products from processing animals such as poultry, cattle, and swine. Other widely available nitrogenous natural materials are wastes from animals, and recovered sludges from sewage treatment plants.

In U.S. Pat. No. 3,655,395 John Karnemaat disclosed a process for treating industrial and municipal wastes suspended or dissolved in water by stepwise treatment with concentrated formaldehyde, nitric acid, and urea to form urea-formaldehyde condensation products which were then dried. Industrial and municipal wastes generally contain sufficient heavy metals to be unacceptable for many agricultural and environmental uses, and must be disposed of in special ways. Karnemaat extended his technology in U.S. Pat. No. 3,939,280 which teaches converting poultry manure to animal feeds by treatment with a catalytic amount of a nontoxic acid, such as sulfuric, phosphoric, citric, propionic and acetic, and with a formaldehyde supplying substance and urea. Although Karnemaat provided a step forward in the art of waste disposal, he did not recognize that natural nitrogenous materials could be caused to develop adhesive properties by heating under alkaline conditions, and that the natural materials could be formed into high integrity granules by mechanical means without polymerized urea-formaldehyde. Further, by adding substantial amounts of extraneous materials Karnemaat converted the initial natural organic material to a urea formaldehyde condensation product.

In U.S. Pat. No. 3,942,970 O'Donnell discloses a system for producing a granular, high nitrogen, odorless fertilizer from sewage filter sludge, which required addition of acid to bring the pH of the sludge to between 3 and 5, and then reacting it with methylolurea at pH 3–5, at 30° to 80° C. with vigorous agitation at temperatures of 30° to 80° C. to provide a granular reaction product of condensed urea formaldehyde polymer combined with the dried sludge. In U.S. Pat. No. 4,081,366 O'Donnell dewatered the urea formaldehyde-sludge mixture by means of vacuum filtration. The acid catalyzed reaction of O'Donnell denatures the natural proteins present in the sludge, thereby significantly reducing their effectiveness as animal feeds or fertilizers. No mechanical means was provided to produce high integrity granules from the natural materials. O'Donnell did not recognize that heating natural nitrogenous materials under alkaline conditions could provide the adhesive properties required to produce high integrity natural granules.

In U.S. Pat. No. 2,977,214, J. H. McLellan was able to produce granules of natural nitrogenous sewage sludge by compacting between high pressure rolls, breaking the compacted sludge and screening it. Unfortunately the particles referred to as granules were not dense, having a bulk density of only 35 pounds per cubic foot indicating a low degree of integrity.

The art has recently taken strong interest in the use of natural nitrogenous materials as plant food and animal feed supplements with a plethora of publications demonstrating their utility in agriculture. The products disclosed have largely been the result of composting, extrusion, compacting, pelletizing, or inclusion in resinous agglomerates. No teachings or suggestions have provided a method of forming these natural materials, wastes, and by-products into high integrity granules by heating under alkaline conditions until they develop adhesive properties.

Terms used herein are defined in the following list:

1. Natural nitrogenous materials—any substance occurring in nature formed by living organisms and containing nitrogen, including processing by-products and wastes, usually in the form of protein or complex organic nitrogen compounds such as uric acid.
2. High integrity—high degree of soundness, strength, and resistance to attrition.
3. Adhesive property—the capability of bonding surfaces together by surface attachment.
4. Water soluble nitrogen—soluble in water as defined by the Association of American Plant Food Control Officials (AAPFCO).
5. Harden—to make not soft but solid and firm to touch.
6. Liquid phase—the liquid portion of a mixture containing liquid and solid under process conditions.
7. Chopper—device for cutting into small pieces by hitting with sharp knives or bars.
8. Substantial—large enough to affect physical properties.
9. Percent—weight percent.
10. Agriculture—the industry of producing crops and animals employing plant foods and animal feed supplements.
11. Basic Conditions—where pH is between 7 and 14.
12. Base—class of compounds producing pH's between 7 and 14 and having the ability to neutralize acids.
13. Agricultural Nutrient Substances—synthetic or natural materials normally used in the field of agriculture as plant nutrients or animal feed supplements.

OBJECTS OF THE INVENTION

It is a primary object of the present invention to provide a method of preparing high integrity natural nitrogenous granules for agriculture from natural nitrogenous materials.

It is a further primary object of the present invention to provide a composition of high integrity nitrogenous granules which is useful in agriculture.

It is a further primary object of the present invention to provide a method of preparing high integrity natural based nitrogenous granules for agriculture from natural nitrogenous materials and added agricultural nutrient substances.

It is a further primary object of the present invention to provide a composition of high integrity natural based nitrogenous granules for agriculture which contain added natural or synthetic agricultural nutrient substances which are useful as agricultural nutrients.

SUMMARY OF THE INVENTION

The present invention is directed to a method of preparing high integrity natural nitrogenous granules for agriculture from natural nitrogenous materials which may be nitrogenous products found in nature, but usually are natural by-products, or wastes, from the agricultural industry.

The method involves heating the natural nitrogenous material under basic conditions until this material develops adhesive properties, forming the adhesive material into granules by mechanical means, and continuing to heat the granules until they harden.

I have discovered that with proper heating of natural nitrogenous materials under basic conditions in the present of moisture, hydrolysis of the nitrogenous material surfaces occurs making the surfaces sticky so that the materials develop adhesive properties and may be formed by mechanical means into granules. When these granules are heated further granules harden and develop a high degree of physical integrity.

I have also discovered that compositions prepared by the method of this invention are effective for use in agriculture, particularly as fertilizers, secondary nutrients, micronutrients, and animal feed protein supplements.

It was found that additional other agricultural nutrient substances may be included with natural nitrogenous materials in the method of this invention so long as the total of these added substances do not exceed one-half of the weight of the final product, thereby diminishing granule integrity.

It was also found that the method of this invention produced natural based nitrogenous granules for agriculture which exhibited no disagreeable odor when a small amount of aldehyde compound reactive with amines and mercaptans was mixed with the natural nitrogenous materials prior to the heating under basic conditions to develop adhesive properties for granule formation.

It was also found that the integrity of the granules was improved when the granules formed under basic conditions were neutralized with acidic materials.

DESCRIPTION OF PRESENTLY PREFERRED EMBODIMENTS

The method of the present invention prepares natural granules which have exceptionally high integrity, that is they are hard, strong, and resist attrition when abraded by rough handling, shipping or applying. The granules are particularly effective in agriculture for use as natural plant nutrients and animal feed supplements because their high physical integrity has been created without changing the desirable compositions of the natural nitrogenous starting materials.

A wide variety of natural nitrogenous materials are available in the environment and as wastes or by-products in the agricultural industry which may be effectively used in the present invention. I have found that when these materials are heated under basic conditions that the surfaces of the materials develop adhesive properties and that granules may be formed by mechanical means while the natural materials have adhesive properties. Surprisingly, if granules formed from the adhesive materials are heated further, the granules harden, lose their adhesive properties, and become free-flowing high integrity granules.

The adhesive properties were found to develop as a result of base catalyzed surface hydrolysis of natural proteins and complex nitrogen compounds, and the presence of moisture in amounts between 5 and 70 percent by weight was found to be necessary to produce hardened granules of high integrity in a reasonable treatment time. Higher moistures made the mechanical means for forming the granules difficult to operate and slowed the hardening of the granules, while lower moistures slowed the development of adhesive properties.

The development of the adhesive properties in the natural nitrogenous materials requires that some of the natural nitrogen be in the water soluble form. It was found that satisfactory operation could be obtained when the natural nitrogenous materials were heated until between 5 and 50 percent of the natural nitrogen was water soluble. Lower amounts caused poor adhesive properties and higher amounts caused the mixture to form large balls or globules in the mechanical granulation, producing unsatisfactory operations and product.

The heating required to develop adhesive properties in the natural nitrogenous materials under basic conditions may be varied somewhat depending upon the materials used, but adhesive properties were satisfactorily developed at temperatures between 50° and 100° C. when held for periods of time between 3 and 60 minutes. Longer periods of heating produced too much hydrolysis and materials too wet for effective mechanical granulation. Temperatures higher than 100° C. or treatments with acid caused the denaturing of the proteins in the natural materials reducing their availability in animal feed supplements and slowing their release of nitrogen in plant foods. The heating may be done by conventional means such as direct injection of steam, or heating in a jacketed vessel. When the heating is done, it is necessary that the natural materials be moving, stirred, or agitated so that heat transfer to all particles is good with none of them being overheated.

Rotary drum granulation, compacting, punch and die pelletizing, and extrusion were all found to be unsatisfactory means of forming granules from natural nitrogenous materials, producing low density, low strength, dusty, and low integrity granules.

Mechanical means were found by which high integrity granules could be prepared from the adhesive natural nitrogenous materials. The preferred means was a stationary granulating cylinder containing mixing elements mounted onto a rotating central shaft traversing the cylinder which throw the natural materials toward the center of the granulating cylinder. These mixing elements run close to the wall of the cylinder and prevent the adhesive materials from sticking to the wall. The mixing elements are operated at a speed sufficient to force axial and radial flows simultaneously on all the particles of material in the cylinder creating a mechanically fluidized bed. The action of the fluid bed causes the adhesive materials to form nearly spherical granules in the open space of the granulating cylinder. The size, shape, peripheral speed of the mixing elements may be regulated to match the physical properties of the individual natural nitrogenous materials used to form closely-sized granules.

It was found that the particle size range of the granules prepared in the stationary granulating cylinder could be narrowed by equipping the cylinder with one or more independently driven choppers mounted in the side wall of the cylinder to break lumps and control particle size. Depending upon the length of the granulating cylinder the number of choppers employed is varied, with the distance between choppers along the cylinder wall amounting to about two diameters of the granulating cylinder.

Although the granulation was effectively carried out in the mechanically fluidized bed it was found that granulation could be improved still further when fluidization was assisted by the upward flow of air through the natural nitrogenous materials during granulation at linear velocities between 0.5 and 5.0 feet per second. Further, it was found that the air flow improved the hardening of the granules.

After the granules were formed by mechanical means from the adhesive materials it was found effective to continue to heat the granules at a temperature between 75° and 100° C. for a period of time between 5 and 20 minutes until they harden, and no longer show adhesive properties.

When the granules have been hardened, they still may contain more water than desirable from the standpoints of storage stability, and shipping economics. It was found that these desirable conditions may be obtained by an additional step of drying with warm air at temperatures between 80° and 110° C. until the granules contain between 0 and 8 percent water.

Most of the natural nitrogenous materials have near-neutral pH's and it was found necessary to admix a base to the material to improve the development of its adhesive properties when it is heated. Alkali metal hydroxides such as sodium and potassium hydroxides are economical and particularly effective bases for assisting the formation of adhesive properties. It was found that the use of these alkalis in amounts between 1 and 10 percent of the materials are particularly effective. It is necessary to the safe, effective use of the granular products, that the strong basic pH's created by these strong bases be neutralized after granules are formed and the neutralization improves the physical integrity of the hardened granules.

The natural nitrogenous granules prepared by the method of this invention are effective as plant foods and these granular plant foods may be prepared from a single natural nitrogen material or a combination of several natural materials. Some of the natural nitrogenous materials found to be particularly effective in preparing granular plant foods are: poultry waste, poultry feather meal, swine hair meal, seafood meal — including fish meal, crab meal and shrimp meal, blood meal, bone meal, and soybean meal.

When natural nitrogenous granules are prepared as animal feed protein supplements by the method of this invention one or more of the following natural nitrogenous materials was found to be particularly effective: soybean meal, poultry feather meal, hair meal, seafood meal, meat and bone meal, blood meal, food waste and grain by-products.

The granule composition prepared by the method of the present invention is effective as a new product for use in agriculture. The composition was found to preserve the natural nitrogen values of the original in a form which is readily deliverable for effective release for agricultural utilization for a wide variety of uses. The granule composition was found to be particularly effective as a nitrogen plant food, releasing its nitrogen content in a slow but complete manner without hazard to the environment, after effective delivery to its use site. Similarly when the composition of this invention was utilized as a natural animal feed protein supplement, it was found that the protein content of the natural materials was preserved without denaturing so that it could be effectively metabolized as a protein supplementation by animals being fed commercially.

The method of this invention was found to be particularly effective in preparing high integrity natural nitrogenous granular fertilizers from natural nitrogenous materials when those materials consisted of one or more of the following by-products or wastes: poultry waste, poultry feather meal, hair meal, seafood meal, blood meal, bone meal, and soybean meal. In this effective method, these materials are charged in a stationary granulating cylinder containing mixing elements mounted on a central rotating shaft which throws these natural materials toward the center of the granulating cylinder, forcing axial and radial flows simultaneously on the materials creating a mechanically fluidized bed, the fluidization being assisted by an upward flow of air through the fluidized bed at a linear velocity between 0.8 and 2.0 feet per second. For optimum effectiveness the granulating cylinder should be equipped with one or more independently driven choppers in the side wall of the cylinder to control the size of the granules formed. Using the method of the present invention it is most effective to admix aqueous alkali metal hydroxides amounting to between 2 and 5 percent on a dry basis with the natural nitrogenous materials which preferably contain between 10 and 35 percent water, to heat the mixture to a temperature preferably between 70° and 90° C. for a period of time between 10 and 30 minutes to hydrolyze the natural materials until preferably between 15 and 40 percent of the natural nitrogen materials are water soluble and the nitrogenous materials develop adhesive properties.

It was found preferable in the instant invention to form the nitrogenous materials into fertilizer granules by means of the simultaneously applied axial and radial flows in the air assisted, mechanically fluidized bed while the nitrogenous materials contain between 15 and 50 percent water and exhibit adhesive properties. Water may be added, if necessary, to bring the water content to the optimum level for granule formation, and it may be decreased to that level by dewatering or drying, if necessary.

When the granules have been formed by mechanical means it is preferred to neutralize them to a pH between 6.0 and 8.5 by admixing acidic materials which are non-toxic, economical, and useful in fertilizers. Acidic materials found effective in this method include: sulfuric acid, phosphoric acid, acetic acid, ammonium phosphate, and ammonium sulfate.

Once the fertilizer granules are neutralized they are preferably hardened by continuing to heat them in the granulating cylinder at a temperature between 70° and 95° C. for a period of time between 5 and 30 minutes until they become free flowing.

Although the hardened fertilizers are useful as fertilizers, it is preferred to dry them further so they will not mold, or spoil and water will not needlessly be shipped. This drying is preferably done by discharging the hardened natural fertilizer granules from the stationary granulating cylinder into a dryer operating with air exit temperature, after passing through the drying granules, of between 80° and 90° C. The fertilizer granules are preferably held in the dryer until they contain between 1 and 5 percent water.

The preferred method of preparing high integrity granular natural animal feed protein supplements is in an apparatus like that used in the preferred fertilizer method. The preferred natural proteinaceous materials for use in preparing these protein feed supplements are one or more of the following: soybean meal, corn gluten, poultry feather meal, hair meal, meat and bone meal, blood meal, seafood meal, and grain by-product.

To prepare the granular animal feed protein supplements, aqueous alkali metal hydroxides, preferably amounting to between 3 and 6 percent on a dry basis, are admixed with the natural proteinaceous materials which contain between 10 and 35 percent water and heating the mixture to a temperature between 70° and 90° C. for a period of time, preferably between 10 and 40 minutes to hydrolyze the natural proteins until between 5 and 20 percent of the protein nitrogen is water soluble and the proteinaceous materials develop adhesive properties.

It is preferred to form the proteinaceous materials into animal feed protein supplement granules by means of the simultaneously applied axial and radial flows in an air assisted, mechanically fluidized bed while the proteinaceous materials contain between 10 and 35 percent water and exhibit adhesive properties.

To obtain optimum safety, performance and physical integrity of the animal feed protein supplements it is preferred to neutralize the granules to a pH between 6.0 and 8.5 by adding acidic materials which are non-toxic, economical, and widely available. Some of these acidic materials found to be effective are listed as follows: phosphoric acid, sulfuric acid, acetic acid, fatty acids, ammonium sulfate, and ammonium phosphate.

To harden the granular animal feed protein supplements it is preferred to continue to heat them in the granulating cylinder at a temperature between 70° and 85° C. for a period of time between 8 and 15 minutes until they harden and are free flowing.

Although the hardened granules are themselves useful as feed supplements, it is preferred to dry them by discharging the hardened natural feed supplement granules into a dryer, preferably a fluid bed dryer, operating with an air exit temperature between 75° and 90° C., and holding the granules in the dryer until their moisture content has been reduced to a level, preferably, between 1 and 10 percent water.

Where completely natural products are not required, the method of this invention may be used to prepare natural based products containing other substances useful in agriculture, particularly synthetic and other natural agricultural nutrient substances. It was found that sufficient adhesive power is developed by the heated natural nitrogenous materials when they are heated under basic conditions to allow the formation of strong granules with up to 50 percent other substances added when the mixture is heated under basic condition and granulated by mechanical means.

When applying the method of the present invention to preparing high integrity natural based nitrogenous granules for agriculture it was preferable to admix the other agricultural nutrient substances in amounts between 1 and 50 percent with the natural nitrogenous materials containing a substantial amount of water and then to heat the mixture under basic conditions until the nitrogenous materials develop adhesive properties. The adhesive materials may then be formed by mechanical means and heated further until they harden and exhibit free flowing properties.

High integrity natural based nitrogenous granules for agriculture may be produced by the method of this invention as effective fertilizers where the nutrient substances amount to a total of between 10 and 50 percent of the weight of the free flowing granules. The nutrient substances effectively admixed with the natural nitrogenous materials include the synthetic or natural nitrogen, phosphorous, and potassium plant nutrients required to supply the complete nutrient requirement for plant growth.

Synthetic nitrogen sources found to be effective as nutrient substances in the present invention include urea, ammonium sulfate, methylol urea, methylene urea, isobutylene diurea, crotonylidene diurea, ammonia, and ammonium nitrate. Care must be observed in handling, formulating, and heating potentially explosive ammonium nitrate. The slow releasing methylol urea, methylene urea, isobutylene diurea and crotonylidene diurea may be formed in-situ by the reaction of the appropriate aldehyde with urea.

Phosphorous plant nutrient substances found to be effective in the method of the instant invention include phosphate rock, phosphoric acid, bone meal, ammonium phosphate, potassium phosphate and ammonium polyphosphate. The phosphate rock and bone meal are preferably ground to a fine powder prior to their use.

Effective potassium plant nutrient substances in the present method of producing high integrity natural based fertilizer granules were found to include potassium chloride, potassium nitrate, potassium sulfate, magnesium potassium sulfate, potassium carbonate, and potassium phosphate.

The natural nitrogenous materials available as wastes and by-products from agriculture usually contain valuable amounts of the secondary nutrient elements calcium, and magnesium. It was found that natural based nitrogenous granules can be prepared for agriculture which contain additional secondary nutrients and are useful as secondary nutrients for feeding plants. In this method, the substances found suitable for admixing with the natural nitrogenous materials were alkaline earth compounds and were, preferably, one or more of the following compounds: magnesium oxide, magnesium carbonate, magnesium sulfate, magnesium phosphate, calcium oxide, calcium carbonate, calcium sulfate and calcium phosphate. The integrity and storage stability of the granules are optimum when the total alkaline earth compounds added amounts to, preferably, between 2 and 20 percent of the final product weight.

The natural nitrogenous materials available usually contain enough micronutrients to enhance the value of the material as either a fertilizer or an animal feed protein supplement. By use of the instant method, natural based nitrogenous granules for agriculture may be produced which are suitable for use as micronutrient concentrates for plants or animals. To make these concentrates it was found that micronutrient substances could be added to the natural nitrogenous materials in total amounts between 0.5 and 35 percent and excellent granule integrity could be retained. Preferred micronutrient substances for addition consist of zinc oxide, zinc sulfate, zinc citrate, zinc chelate, iron sulfate, iron chelate, manganese sulfate and copper sulfate.

The method of the instant invention may be used to prepare natural based nitrogenous granules for agriculture which are animal feed protein supplements, where it is desired to fortify the natural material with additional non-protein nitrogen sources, such as urea or biuret. It also may be desirable to fortify the phosphorous, potassium, calcium, magnesium, iodine, and other mineral levels of a natural protein supplement. It is also possible to further fortify the final dry granule by spraying or coating with single or multiple vitamin mixtures of value in animal health. It was found that free flowing high integrity granules of animal feed protein supplements could be produced when the total amount of animal nutrients mixed with the natural nitrogenous materials was preferably between 3 and 25 percent.

It was found that the composition of natural based nitrogenous fertilizer granules prepared by the present method were uniquely effective and safe plant foods. The composition including urea, methylol urea, methylene urea, and the hydrolyzed natural nitrogenous material was found to safely release nitrogen and effectively grow long season plants with only one initial fertilizer application, clearly demonstrating the uniqueness of the present composition.

The composition of the natural based nitrogenous feed protein supplement granules is unique. Its resistance to attrition, dust-free property, and particularly its homogeniety provide a feed supplement product with heretofore only desired properties and feeding safety. The proteins in the composition are highly available for animal digestion and use.

Some of the available natural nitrogenous materials such as soybean and grain meals have pleasant odors and some of the natural nitrogenous materials which are by-products and wastes from the agricultural industry such as feather meal have only mild odors. Granules produced by the present method from mild nitrogenous sources may exhibit acceptable odors when treated with mild odorants such as cane molasses, eucalyptas oil, or mint extract. Some of nitrogenous materials, such as the wastes, have very disagreeable odors which continue to exist in the hardened granules formed from them. It was found that the problem of disagreeable odors in the granules could be eliminated by adding to the natural waste an aldehyde compound which is reactive with amines and mercaptans. Using this discovery in the method of the present invention a method was devised for granules with no disagreeable odors.

In this method of producing natural based nitrogenous granules for agriculture which exhibit no disagreeable odor, between 1 and 10 percent of an aldehyde compound which is reactive with amines and mercaptans is mixed with natural nitrogenous materials containing a substantial amount of water. The mixture is heated under basic conditions to temperatures between 70° and 90° C. until no disagreeable odor persists and the nitrogenous materials develop adhesive properties. The mixture is formed into granules by mechanical means while the mixture still exhibits adhesive properties. The granules are heated further until they harden and exhibit free flowing properties.

The preferred aldehyde compounds, reactive with amines and mercaptans were found to be: aqueous formaldehyde, aqueous methylol urea, aqueous urea formaldehyde concentrate, aqueous methylene urea, hexamethylene tetramine, acetaldehyde, crotonaldehyde, and propionaldehyde.

The composition of the natural based nitrogenous granules for agriculture exhibiting no disagreeable odor prepared by the method of this invention using aldehyde compounds was unique in that it performed as satisfactorily as a nitrogen supplier, and stored and handled as well as the natural based granule compositions which were not treated to eliminate the disagreeable odors.

The method of this invention was found to be applicable for preparing many products for agriculture from many sources of natural nitrogenous materials under the range of conditions defined herein. A preferred use of the present invention is a method of producing high integrity, low odor, natural based, granular fertilizers, in which aqueous formaldehyde amounting to between 1 and 5 percent, dry basis, between 0 and 30 percent urea prills, and between 0 and 30 percent soluble potassium chloride are mixed with natural nitrogenous composted chick waste containing between 40 and 75 percent water. The mixture is heated at a pH between 8.0 and 11.5 to a temperature between 70° and 85° C. and held for a period of time between 10 and 30 minutes until between 15 and 40 percent of the chick waste nitrogen is in water soluble form and the mixture develops adhesive properties. The mixture is formed into fertilizer granules by means of simultaneously applied axial and radial flows in an air assisted, mechanically fluidized bed, while the mixture still contains between 20 and 40 percent water and exhibits adhesive properties. The fertilizer granules are neutralized to a pH between 6.5 and 8.0 by adding mineral acid while the granules are still in the fluid bed. By continuing to heat the granules in the fluid bed at a temperature between 78° and 85° C. for a period of time between 8 and 20 minutes the fertilizer granules are hardened until they exhibit free flowing properties.

The composition of high integrity, low odor, natural based granular fertilizers prepared by the method of this invention provide optimum product handling and storage properties and optimum performance properties for long term safe release of mineral nitrogen in soils for feeding plants.

The following examples illustrate the method of the present invention of preparing high integrity natural nitrogenous granules for agriculture and the efficacy of the composition prepared thereby.

EXAMPLE 1

Example 1 illustrates the method of preparing high integrity natural nitrogenous granules for agriculture by heating natural nitrogenous materials under basic conditions, forming granules by simple mechanical means and heating the granules until they harden.

To an electrically heated laboratory stainless steel mixergranulator having a vertical cylindrical shape with an inside diameter of 20 centimeters, a height of 28 centimeters, and equipped with an agitator consisting of 4 flat stainless steel bars, each 9.5 centimeters long, 2 centimeters high, and 0.5 centimeters thick, was added 500 grams of the natural nitrogenous material poultry feather meal.

To the feather meal was added 150 grams of water, and 25 grams of sodium hydroxide. The agitator was operated at a speed of about 120 rpm and the mixture was heated to 80° C. After about five minutes at 80° C. the mixture became sticky, developing adhesive properties and granules formed. Agitation was continued and temperature was maintained between 76° and 85° C. for an additional 15 minutes and the granules hardened. Heating and agitation were terminated and the contents were placed in an oven and dried with high velocity air circulation at 90° C.

The granules were cooled and screened. The high physical integrity of the granules was indicated by their hardness. Although there was a wide size range of the near spherical granules produced there was no dust in the product and after shaking in a screening machine for 10 minutes no dust was created by attrition. Analytical determination of nitrogen in the granular fertilizer product showed a 12.8 percent nitrogen content, all of which was natural.

EXAMPLE 2

Example 2 illustrates the efficacy of the high integrity natural nitrogenous granule composition for agriculture prepared in Example 1 as plant foods.

Common ryegrass was planted in twelve six inch diameter plastic pots containing soil depleted of nitrogen and after the seeds had germinated and the blade heights were about ½ inch high, four pots were treated with the product of Example 1 to provide nitrogen at a rate of 3 pounds per thousand square feet. Four pots were treated with urea to provide nitrogen at a rate of 3 pounds per thousand square feet, and the other four pots received no nitrogen. Each of the pots in the test received phosphorous pentoxide at the rate of 1 pound per 1000 square feet and potassium oxide at the rate of 0.5 pounds per 1000 square feet. Each pot was irrigated with water every third day at the rate of one inch per week.

The pots receiving no nitrogen quickly showed stress and by the eighth week the few remaining blades of grass were brown. The pots receiving the urea nitrogen after one week showed strong burn stress with the blades mostly yellow. By the fourther week the urea treated grass stand was largely reduced by dead grass blades and most of the remaining blades were yellow. After the sixth week the urea treated grass contained a few remaining grass blades which were green and growing rapidly. After the eighth week the few urea treated grass blades remaining had about stopped growing and were showing signs of stress from the lack of nitrogen.

The pots receiving the granules of Example 1 showed a consistant green color and growth, although the initial growth was slower than that of the surviving urea treated blades. After six and eight weeks the pots receiving the granules of Example 1 were green and the growth rate of the grass in the pots was near steady and still increasing slightly.

EXAMPLE 3

This example illustrates the efficacy of the high integrity natural nitrogenous granules prepared in Example 1 as a controlled release animal feed protein supplement.

Tests were made on the comparative ammonia release in rumen fluid between the product of Example 1 and urea. Rumen fluid was withdrawn from a fistulated Hereford steer which had received no protein for 24 hours prior to removal of the test rumen fluid. Control and test samples were prepared, buffered and diluted to a total nitrogen concentration of 2500 micrograms per milliliter and 5 milliliter samples were placed in a fermenter at 38° C. using four replications of each sample. The conversion of the nitrogen into ammonia by the rumen fluid was measured by analyses, initially, after 30 minutes, and after 210 minutes. With the urea the ammonia contents in those analyses were 17, 360, and 1400 micrograms per milliliter, indicating rapid degradation of the urea in rumen fluid. With the product of Example 1, the ammonia contents, initially, and after 30 and 210 minutes were 20, 75, and 250, respectively, indicating a gradual and safe digestion of the natural nitrogenous granules of Example 1 by animals.

EXAMPLE 4

This example illustrates the method of preparing high integrity natural nitrogenous granules for fertilizers under basic conditions, forming granules in an effective mechanical means, neutralizing, heating the granules until they harden, and drying.

A steam jacketed Littleford FM-130 Mixer having a diameter of 24 inches and a length of 30 inches was used in this example. The mixer was used as a horizontal stationary granulating cylinder. It contained two mixing elements mounted on a central shaft, rotating at a peripheral speed of 725 feet per minute, with each mixing element arranged to throw the cylinder contents toward the center of the granulating cylinder and force axial and radial flows simultaneously on the contents, creating a mechanically fluidized bed. The mechanical fluidization was improved and granule size was controlled by a single three-bladed 6 inch diameter chopper extending through the cylinder wall 6 inches toward the center of the cylinder, operating between the two mixing elements at a blade peripheral speed of 5400 feet per minute. Fluidization was further improved by applying air through the bottom wall of the horizontal cylinder to produce an upward linear air flow rate of about 1 foot per second.

To the horizontal stationary granulating cylinder was charged poultry feather meal amounting to 72 pounds with analyses by weight percent listed as follows: nitrogen, 12.8; phosphorous pentoxide, 1.6; sulfur, 1.6; potassium oxide, 0.4; and moisture, 8.0. Also added was 3.5 pounds of sodium hydroxide and 3.5 pounds of water. The materials were mixed, fluidized and heated by operation of the granulating cylinder initially with direct injection of steam into the mixture to secure quick heat, and further heating through the steam jacketed wall of the cylinder, so that an internal temperature of 78° C. was achieved in five minutes and pH was measured to be 9.8. Analyses showed that 21 percent of the nitrogen of the poultry feather meal was now water soluble. After holding the poultry feather meal for 18 minutes at about 78° C. it developed adhesive properties and formed into nearly spherical granules. The granules were neutralized, as a 10 percent water mixture, to a pH of 7.4 by adding phosphoric acid. Temperature was increased to 84° C. and the granulating cylinder continued to operate in a fluidized manner for 12 minutes and the granules formed were hardened sufficiently to flow freely.

The apparatus was shut down and the granules were discharged through a port in the bottom wall of the horizontal cylinder, to a fluid bed dryer operating with an air discharge temperature of 93° C. The granules were dried in the fluid bed dryer until their moisture content was 3.6 percent, and then screened into two size ranges for use as fertilizers, fine and oversize ranges for recycle to the granulating cylinder. Screen analysis is listed as follows:

| U.S. Screen Range | Wt % |
|---|---|
| +5 for recycle | 11.7 |
| −5 +10 for fertilizer use | 41.3 |
| −10 +25 for fertilizer use | 37.4 |
| −25 for recycle | 9.6 |

The product contained no dust and analyzed 11.9 percent nitrogen.

EXAMPLE 5

This example illustrates the method of preparing high integrity, low odor, natural based nitrogenous granules for fertilizers.

Using the apparatus of Example 4, 62.2 pounds of composted layer waste was charged, containing the weight percent analysis listed as follows: nitrogen, 3.15; water, 68.0; calcium, 10.7; phosphorous pentoxide, 5.7; potassium oxide, 2.4; and sulfur, 0.8. Then, 4.0 pounds of aqueous urea formaldehyde concentrate, derived from 48.9 parts formaldehyde and 19.2 parts of urea, was admixed with the layer waste. Also admixed were 23.1 pounds of urea prills, and 7.3 pounds of soluble potassium chloride. After mixing thoroughly the pH was found to be 9.1. The materials were heated to a temperature of 74° C. and held under fluidizing conditions until the mixture developed adhesive properties and formed granules after 18 minutes.

Phosphoric acid, containing 62 percent phosphorous pentoxide was added in an amount of 2.0 pounds to neutralize the granules to a pH of 7.3 and heating fluidization were continued for 12 minutes more until the granules hardened and were free flowing.

The granules were withdrawn from the granulating cylinder and dried in a fluid bed dryer at an air discharge temperature of 94° C. until their moisture content was 3.1 percent. The dried granules were hard and resistant to attrition and were analyzed to indicate the chemical composition listed as follows:

| Component | Wt % |
|---|---|
| Nitrogen | 15.5 |
| $P_2O_5$ | 5.4 |
| $K_2O$ | 7.6 |
| Ca | 7.3 |
| S | 0.5 |

I claim:

1. A method of preparing high integrity natural nitrogenous granules for agriculture comprising:
   (a) heating natural nitrogenous materials containing between 5 and 70 percent moisture under basic conditions at a pH between about 8 and 14 with a temperature between about 40° and 100° C. for a period of time between 3 and 60 minutes until between 5 and 50 percent of contained nitrogen is solubilized and the nitrogenous materials exhibit adhesive properties, the natural nitrogenous materials being selected from those substances formed in nature by living organisms containing between about 3 and 13 percent nitrogen as complex organic compounds which exhibit an ability to be solublized under basic conditions and selected from the group consisting of poultry waste, poultry feather meal, hair meal, blood meal, bone meal and soybean meal;
   (b) forming the natural nitrogenous materials into granules within a mechanically fluidized bed by mechanical means while the materials exhibit adhesive properties, the mechanical means comprising a stationary granulating cylinder containing mixing elements mounted on a rotating central shaft operated at speeds sufficient to throw the natural nitrogenous materials toward the center of the granulating cylinder, forcing axial and radial flows simultaneously on the materials, thereby forming granules in open space in the granulating cylinder;
   (c) heating the natural nitrogenous granules at a temperature between 75° and 100° C. for a period of time between 5 and 20 minutes until they harden and exhibit no adhesive properties.

2. The method of claim 1 wherein the granulating cylinder is equipped with one, or more, independently driven choppers mounted in the side wall of the cylinder to break lumps and control particle size of granules formed in the cylinder.

3. The method of claim 1 wherein fluidization of the mechanically fluidized bed is assisted by flowing air upwardly through natural nitrogenous materials at linear velocities between 0.5 and 5 feet per second while granules are being formed and hardened.

4. The method of claim 1 wherein the hardened natural nitrogenous granules are dried in an additional step by warm air at temperatures between 80° and 110° C. until the granules contain between 0 and 8 percent water.

5. The method of claim 1 wherein a base is admixed with the natural nitrogenous materials to provide the pH between 8 and 14 required to obtain adhesive properties in the nitrogenous materials.

6. The method of claim 1 wherein alkali metal hydroxide base is added to the natural nitrogenous materials in amounts between 1 and 10 percent to provide the adhesive properties, and is then neutralized by admixing acidic materials after granules are formed.

7. The method of claim 1 wherein between 1 and 50 percent of other agricultural substances selected from natural and synthetic plant nutrient compounds are admixed with the natural nitrogenous materials before adhesive properties are developed in the nitrogenous materials.

8. The method of claim 7 wherein the other agricultural substances admixed with the natural nitrogenous materials are nitrogen, phosphorous, and potassium plant nutrients, amounting to between 10 and 50 percent of the granules formed.

9. The method of claim 8 wherein the nitrogen plant nutrients are substances selected from the group consisting of urea, ammonium sulfate, methylol urea, methylene urea, isobutylene diurea, crotonylidene diurea, ammonia, and ammonium nitrate.

10. The method of claim 8 wherein the phosphorous plant nutrients are substances selected from the group consisting of phosphate rock, phosphoric acid, bone meal, ammonium phosphate, potassium phosphate, and ammonium polyphosphate.

11. The method of claim 8 wherein the potassium plant nutrients are substances selected from the group consisting of potassium chloride, potassium nitrate, potassium sulfate, magnesium potassium sulfate, potassium carbonate, and potassium phosphate.

12. The method of claim 7 wherein the other agricultural substances admixed with the natural nitrogenous materials are alkaline earth compounds selected from the group consisting of magnesium oxide, magnesium carbonate, magnesium sulfate, magnesium phosphate, calcium oxide, calcium carbonate, calcium sulfate, and calcium phosphate, amounting in total to between 2 and 20 percent of the hardened granules.

13. The method of claim 7 wherein the agricultural substances admixed with the natural nitrogenous materials are plant micronutrient metal compounds selected from the group consisting of zinc oxide, zinc sulfate, zinc citrate, zinc chelate, iron sulfate, iron chelate, manganese sulfate, and copper sulfate.

14. The composition of natural based nitrogenous fertilizer granules prepared by the method of claim 7.

15. A method of preparing high integrity natural nitrogenous granular fertilizers from natural nitrogenous materials selected from the group consisting of poultry waste, poultry feather meal, hair meal, seafood meal, blood meal, bone meal, and soybean meal, in a stationary granulating cylinder containing mixing elements mounted to a central rotating shaft which throws the natural nitrogenous materials toward the center of the granulating cylinder, forcing axial and radial flows simultaneously on the materials therein, creating a mechanically fluidized bed, the fluidization being assisted by an upward flow of air through the fluidized bed at a linear velocity between 0.8 and 2.0 feet per second, the granulating cylinder being equipped with an independently driven chopper mounted in the side wall of the cylinder to control size of the granules formed, the method comprising:

(a) admixing aqueous alkali metal hydroxides, amounting to between 2 and 5 percent, on a dry basis, with the natural nitrogenous materials, containing between 10 and 35 percent water, and heating to a temperature between 70° and 90° C. for a period of time between 10 and 30 minutes to hydrolyze the natural materials until between 15 and 40 percent of the nitrogen in the natural nitrogenous materials is water soluble and the nitrogenous materials develop adhesive properties;

(b) forming the nitrogenous materials into fertilizer granules by means of the simultaneously applied axial and radial flows in the air assisted, mechanically fluidized bed while the nitrogenous materials contain between 15 and 50 percent water and exhibit adhesive properties;

(c) neutralizing the fertilizer granules to a pH between 6.0 and 8.5 by admixing acidic materials selected from the group consisting of sulfuric acid, phosphoric acid, acetic acid, ammonium phosphate and ammonium sulfate;

(d) hardening the fertilizer granules by continuing to heat them in the granulating cylinder at a temperature between 70° and 95° C. for a period of time between 5 and 30 minutes until they harden and exhibit free flowing properties;

(e) discharging the hardened natural fertilizer granules from the stationary granulating cylinder into a dryer operating with an air exit temperature between 80° and 98° C., and holding the granules in the dryer until they contain between 1 and 5 percent water.

* * * * *